United States Patent
Motoyama

(10) Patent No.: US 8,149,433 B2
(45) Date of Patent: Apr. 3, 2012

(54) IMAGE FORMING APPARATUS AND CONTROL METHOD FOR IMAGE FORMING APPARATUS

(75) Inventor: Eiichi Motoyama, Shinjuku-ku (JP)

(73) Assignee: Canon Kabushiki Kaisha (JP)

( * ) Notice: Subject to any disclaimer, the term of this patent is extended or adjusted under 35 U.S.C. 154(b) by 1182 days.

(21) Appl. No.: 11/377,832

(22) Filed: Mar. 16, 2006

(65) Prior Publication Data

US 2006/0209352 A1    Sep. 21, 2006

(30) Foreign Application Priority Data

Mar. 18, 2005  (JP) .................................. 2005-080496

(51) Int. Cl.
*G06K 15/00* (2006.01)

(52) U.S. Cl. ............. 358/1.14; 399/9; 399/12; 358/1.15

(58) Field of Classification Search ............ 358/1.1–1.16
See application file for complete search history.

(56) References Cited

U.S. PATENT DOCUMENTS

| | | | |
|---|---|---|---|
| 3,913,070 A | 10/1975 | Malcolm et al. | |
| 4,811,051 A | 3/1989 | Masuda et al. | |
| 4,941,038 A | 7/1990 | Walowit | |
| 4,952,988 A | 8/1990 | Furuichi et al. | |
| 5,028,953 A | 7/1991 | Katoh et al. | |
| 5,130,805 A | 7/1992 | Rikima | |
| 5,164,770 A | 11/1992 | Furuichi et al. | |
| 5,481,335 A | 1/1996 | Furuichi et al. | |
| 5,596,416 A * | 1/1997 | Barry et al. | 358/296 |
| 5,720,014 A | 2/1998 | Ikeda et al. | |
| 5,732,162 A | 3/1998 | Curry | |
| 5,819,034 A | 10/1998 | Joseph et al. | |
| 5,860,038 A | 1/1999 | Kato et al. | |
| 6,185,010 B1 * | 2/2001 | Watanabe | 358/474 |
| 6,226,095 B1 | 5/2001 | Fukuta | |
| 6,249,658 B1 | 6/2001 | Inui et al. | |
| 6,307,615 B1 | 10/2001 | Ito | |
| 6,535,865 B1 | 3/2003 | Skaaning et al. | |
| 6,614,545 B1 | 9/2003 | Langer et al. | |
| 6,763,336 B1 | 7/2004 | Kolls | |
| 7,034,954 B1 | 4/2006 | Utsunomiya | |
| 7,174,264 B2 | 2/2007 | Yasukawa et al. | |
| 7,260,336 B2 | 8/2007 | Shimura et al. | |
| 7,269,757 B2 | 9/2007 | Lieblich et al. | |
| 7,275,009 B2 | 9/2007 | Yasukawa et al. | |
| 7,324,909 B2 | 1/2008 | Yasukawa et al. | |
| 7,436,550 B2 | 10/2008 | Aoki et al. | |

(Continued)

FOREIGN PATENT DOCUMENTS

JP    1-241595 A    9/1989

(Continued)

*Primary Examiner* — Benny Tieu
*Assistant Examiner* — Michael Tzeng
(74) *Attorney, Agent, or Firm* — Rossi, Kimms & McDowell LLP

(57) ABSTRACT

The image forming apparatus executes controls relating to image formation in a dispersed manner without centralization. A printer part of the image forming apparatus includes a laser module, an image process module, a paper-feed cassette module, a conveyance module, a both-side module, a fixing module, a paper discharge module and a shared data module. Each module stores operation condition information, indicating its operation condition in the shared data module, and executes autonomously a specific operation by referring to operation parameters and the operation condition information indicating the operation conditions of the modules, stored in the shared data module.

11 Claims, 13 Drawing Sheets

U.S. PATENT DOCUMENTS

| | | |
|---|---|---|
| 2005/0088700 A1 | 4/2005 | Aoki et al. |
| 2005/0141030 A1 | 6/2005 | Tuchitoi et al. |
| 2005/0262394 A1 | 11/2005 | Yasukawa et al. |
| 2005/0281596 A1 | 12/2005 | Nakagawa et al. |
| 2005/0289559 A1 | 12/2005 | Illowsky et al. |
| 2006/0020912 A1 | 1/2006 | Illowsky et al. |
| 2006/0206882 A1 | 9/2006 | Illowsky et al. |
| 2006/0209341 A1 | 9/2006 | Motoyama |
| 2006/0215215 A1 | 9/2006 | Kumaran |
| 2007/0086037 A1 | 4/2007 | Kitahara |

FOREIGN PATENT DOCUMENTS

| | | |
|---|---|---|
| JP | 5-318819 A | 12/1993 |
| JP | 05-318819 A | 12/1993 |
| JP | 6-245021 A | 9/1994 |
| JP | 8-172497 A | 7/1996 |
| JP | 2003-076413 | 3/2003 |
| JP | 2005-062977 A | 3/2005 |

\* cited by examiner

FIG. 11

| CONVEYANCE MODULE | | |
|---|---|---|
| OCCURRED ABNORMALITY | PROCESSING | LAST MODULE |
| DELAY JAM | IMMEDIATE STOP | PAPER DISCHARGE |
| ACCUMULATED JAM | IMMEDIATE STOP | PAPER DISCHARGE |
| PAPER TYPE DIFFERENCE (UNACCEPTABLE) | IMMEDIATE STOP | PAPER DISCHARGE |

FIG. 13

| MODULE WITH AN OCCURRENCE OF ABNORMAL | OCCURRED ABNORMALITY | PROCESSING |
|---|---|---|
| PAPER FEEDING | PAPER FEEDING DELAY JAM<br>ACCUMULATED JAM<br>SIZE NONCONFORMITY | STOP AFTER COMPLETION OF OPERATION<br>STOP AFTER COMPLETION OF OPERATION<br>STOP AFTER COMPLETION OF OPERATION |
| CONVEYANCE | DELAY JAM<br>ACCUMULATED JAM<br>PAPER TYPE DIFFERENCE (UNACCEPTABLE) | STOP AFTER COMPLETION OF OPERATION<br>STOP AFTER COMPLETION OF OPERATION<br>STOP AFTER COMPLETION OF OPERATION |
| FIXING | DELAY JAM<br>ACCUMULATED JAM | |
| PAPER DISCHARGE | DELAY JAM<br>ACCUMULATED JAM | IMMEDIATE STOP<br>IMMEDIATE STOP |

FIXING MODULE

IMAGE FORMING APPARATUS AND CONTROL METHOD FOR IMAGE FORMING APPARATUS

BACKGROUND OF THE INVENTION

1. Field of the Invention

The present invention relates to an image forming apparatus for image formation on a sheet, and a control method for an image forming apparatus, and more particularly to an image forming apparatus having plural modules which autonomously execute specific operations, and a control method for such image forming apparatus.

2. Related Background Art

Conventionally, an image forming apparatus has been equipped with a control device, called a DC controller, which intensively executes a control regarding image formation. An image forming apparatus having such DC controller is described for example in Japanese Patent Application Laid-open No. H05-318819.

In such prior image forming apparatus, however, the DC controller is subjected to a high load in hardware or in software, because the control is concentrated thereon. For this reason, the load on the DC controller increases as the image forming apparatus becomes larger or more complex in functions.

SUMMARY OF THE INVENTION

Therefore, an object of the present invention is to provide an image forming apparatus for forming an image by a plurality of operations, including a plurality of modules each of which autonomously executes an assigned operation which is assigned among the plurality of operations; and a shared data storing device for storing shared information to be shared by said plurality of modules, wherein each of said plurality of modules stores operation condition information, indicating an operation condition, as shared information in the shared data storing device; and each of said plurality of modules autonomously executes the assigned operation by referring to the information in said shared data storing device.

Still another object of the present invention is to provide a control method for an image forming apparatus including plurality of modules plural each of which autonomously executes an assigned operation assigned among the plurality of operations; and a shared data storing device for storing shared information to be shared by the plurality of modules, the method including a step of storing operation condition information indicating an operation condition of each of said plurality of modules into the shared data storing device as shared information; and a step of autonomously executing a specific operation by referring to the information in the shared data storing device in each of said plurality of modules.

BRIEF DESCRIPTION OF THE DRAWINGS

FIG. 11 is a view showing a table to be used for determining a process to be executed, in a step S2 in FIG. 10;

FIG. 13 is a view showing a table to be used for determining a process to be executed, in a step S12 in FIG. 12.

DETAILED DESCRIPTION OF THE PREFERRED EMBODIMENTS

In the following, an embodiment of the present invention will be explained with reference to the accompanying drawings.

Figure 1:
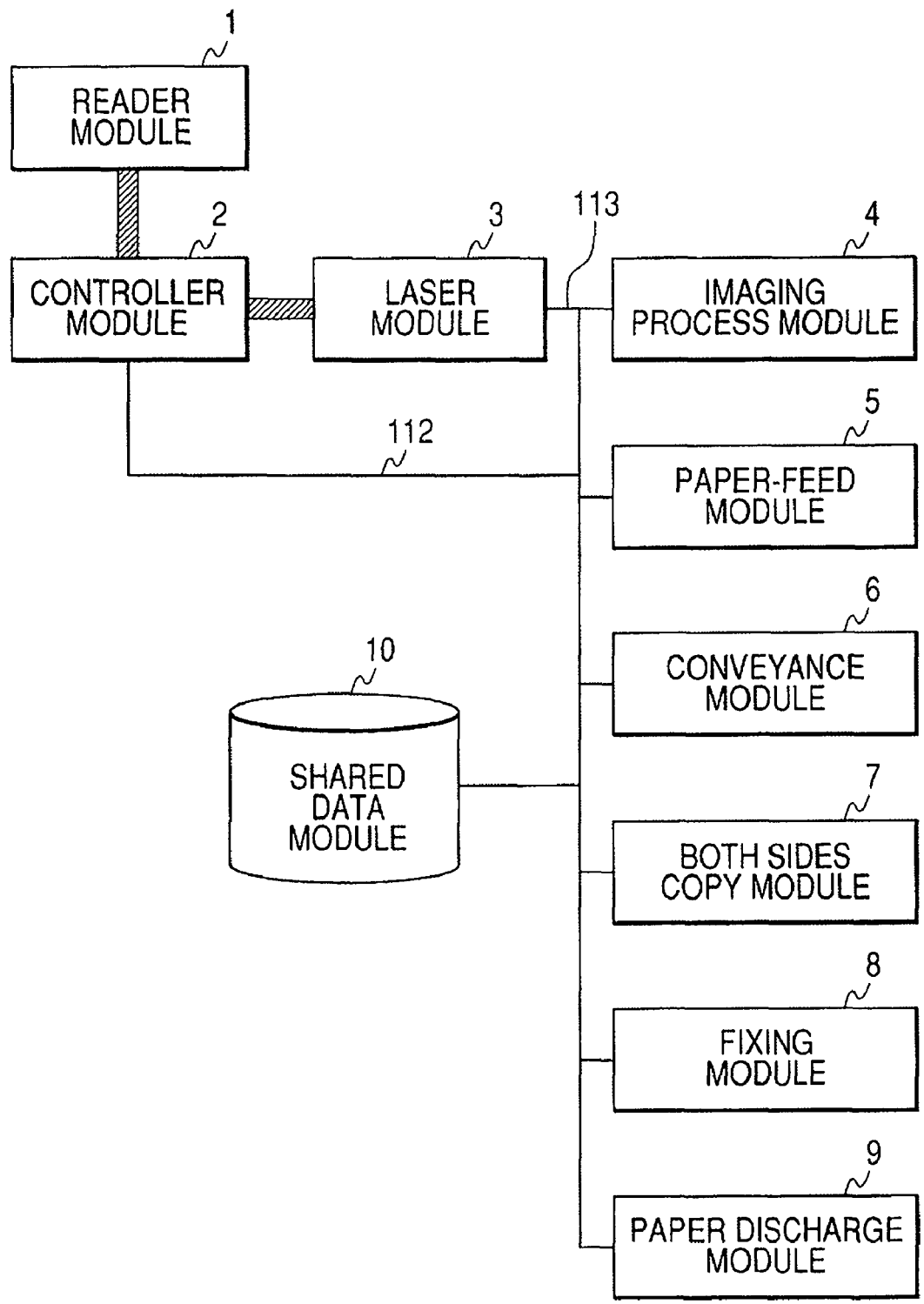
FIG. 1 is a block diagram showing a configuration of an image forming apparatus, constituting an embodiment of the present invention.
Figure 2:
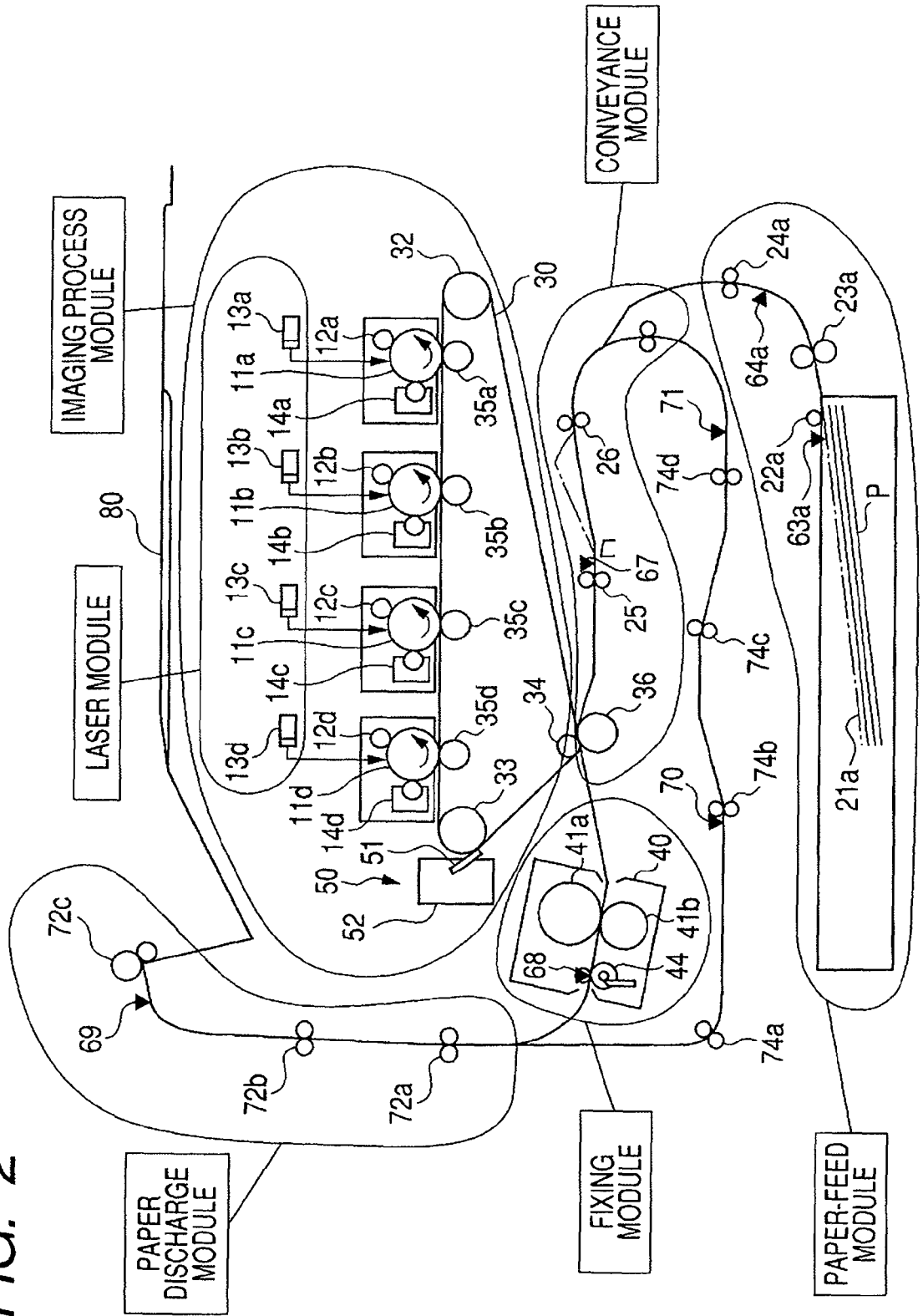
FIG. 2 is a schematic view showing control objects of the modules in a printer, in the image forming apparatus shown in FIG. 1.

FIG. 1 is a block diagram showing a configuration of an image forming apparatus, constituting an embodiment of the present invention, and FIG. 2 is a schematic view showing control objects of the modules in a printer, in the image forming apparatus shown in FIG. 1.

An image forming apparatus is provided, as shown in FIG. 1, with a reader module 1, a controller module 2, and plural modules 3 to 10 constituting a printer part.

More specifically, the reader module 1 is provided with a reader part (not shown) for reading an original, and outputs image data read by the reader part. The controller module 2 has, for example, an image processing function of executing a predetermined image processing on image data outputted from the reader module 1 or on image data received for example from a personal computer through an interface (not shown), a function of setting an operation mode entered from an operating part (not shown), and a function of displaying information on the operating part.

The printer part is provided with a laser module 3, an imaging process module 4, a paper-feed module 5, a conveyance module 6, a both-side module 7, a fixing module 8, a paper discharge module 9 and a shared data module 10. Each of the modules 3 to 9 includes an operation unit formed by a driving component such as a driving motor, a sensor, a driving circuit, a processing circuit or a combination thereof. Each of the modules 3 to 9 autonomously controls the operation of the operation unit contained therein, while referring to the information stored in the shared data module 10, thereby executing a specific operation (assigned operation) assigned to each module.

The laser module 3 includes a laser scanner unit (operation unit) and controls the operation of the laser scanner unit. Thus the laser scanner unit emits a laser light, modulated according to image data, which irradiates a photosensitive drum under a scanning motion in a main scanning direction (scanning exposure). Such scanning exposure generates an electrostatic latent image on the photosensitive drum.

In more details, the laser scanner unit includes, as shown in FIG. 2, scanners 13a to 13d respectively corresponding to yellow, cyan, magenta and black colors. Each of the scanners 13a to 13d includes a laser light emission part (not shown) for outputting a laser modulated according to the image data, and a scanning exposure part for irradiating each of photosensitive drums 11a to 11d with the laser light, emitted from the laser light emission part, under a scanning motion in the main scanning direction by a polygon mirror. The photosensitive drum 11d is positioned at a most upstream position, and electrostatic latent images are formed in an order of the photosensitive drum 11d, photosensitive drum 11c, photosensitive drum 11b and photosensitive drum 11a.

The imaging process module 4 executes a charging process, a developing process, a primary transfer process and a secondary transfer process. More specifically, the charging process is to uniformly charge surfaces of the photosensitive drums 11a to 11d by respectively corresponding roller charger 12a to 12d. The developing process is to develop electrostatic latent images formed on the photosensitive drums 11a-11d, with developing devices 14a to 14d, as visible toner images.

The primary transfer process transfers, by an intermediate transfer belt 30 and primary transfer rollers 35a to 35d, the toner images on the photosensitive drums 11a to 11d in succession and in superposition onto the intermediate transfer belt 30. The intermediate transfer belt 30 is a belt formed for example by PET (polyethylene terephthalate) or PVDF (polyfluorovinylidene) and supported by a drive roller 32, a tension roller 33 and an idler roller 34. The drive roller 32 is driven by a stepping motor (not shown) and drives the intermediate transfer belt 30. The drive roller 32 is formed by a metal roller whose surface is coated with rubber having a thickness of several millimeters, for avoiding a slippage between the drive roller 32 and the intermediate transfer belt 30. The tension roller 33 is pressed by a spring (not shown) so as to provide the intermediate transfer belt 30 with an appropriate tension. The primary transfer rollers 35a to 35d are so positioned as to be opposed to the respectively corresponding photosensitive drums 11a to 11d, across the intermediate transfer belt 30. The primary transfer rollers 35a to 35d are respectively given a high voltage for transferring the toner images on the photosensitive drums 11a to 11d onto the intermediate transfer belt 30.

The secondary transfer process executes, by applying a high voltage to the secondary transfer roller 36, the toner image supported on the intermediate transfer belt 30 onto a paper fed from a paper-feeding cassette 21a to be explained later. The secondary transfer roller 36 is provided in a position opposed to the idler roller 34 across the intermediate transfer belt 30. After the transfer of the toner image from the intermediate transfer belt 30 onto the paper P, some toner may remain on the image bearing surface of the intermediate transfer belt 30. For this reason, a cleaning apparatus 50 is provided at a downstream side of the intermediate transfer belt 30. The cleaning apparatus 50 is maintained in contact with the image bearing surface of the intermediate transfer belt 30, and is constituted of a cleaner belt 51 formed by polyurethane rubber, and a used toner box 52 for containing the toner recovered by the cleaner belt 51.

The paper-feed cassette module 5 controls a pickup roller 22a, paper-feed rollers (separation rollers) 23a and extraction rollers 24a, and feeds papers P stored in a paper-feed cassette 21a, one by one. In the feeding operation of the paper P, a paper P is advanced from the paper-feed cassette 21a by the pickup roller 22a, and conveyed through the paper-feed rollers 23a and the extraction rollers 24a toward registration rollers 25 to be explained later. In the paper-feed system for feeding the paper P, there are provided a sensor 63a for detecting a paper in the paper-feed cassette 21a, and a sensor 64a for detecting passing of the paper P. Based on such sensors 63a, 64a, there are detected when a paper P is picked up or not, and a feed timing of the paper P.

The conveyance module 6 controls the drive of a conveying rollers (pre-registration rollers) 26 and the registration rollers 25, and advances the paper P, fed from the paper-feed cassette 21a, at a predetermined timing, to a secondary transfer region formed between the intermediate transfer belt 30 and the secondary transfer roller 36. In more details, the paper P, fed from the paper-feed cassette 21a, is conveyed by the conveying rollers 26, then once stopped by the registration rollers 25 at the position thereof and advanced at a predetermined timing to the secondary transfer region. A sensor 67 is provided for detecting the paper P, in a position in front (upstream) of the registration rollers 25.

The fixing module 8 controls a fixing apparatus 40 and fixes the toner image, transferred onto the paper P by the secondary transfer process, on the paper. In more details, the fixing apparatus 40 is equipped with a pair of fixing rollers 41a, 41b mutually pressed under a predetermined pressure, thus forming a nip portion therebetween for supporting and conveying the paper P. The fixing roller 41a incorporates a halogen heater therein. The control on the fixing apparatus 40 includes a drive control for the fixing rollers 41a, 41b and an on/off control of the halogen heater for maintaining the surface temperature of the fixing roller 41a at a predetermined fixing temperature. In the fixing module 8, while the paper P passes through the nip portion of the fixing apparatus 40, the toner image on the paper P is heated and pressed thereby being fixed thereon. The paper P, having passed the fixing rollers 41a, 41b, is discharged by discharge rollers 44 to the exterior of the fixing apparatus 40. In the fixing apparatus 40, a sensor 68 is provided for detecting a passing of the paper P.

The paper discharge module 9 controls drive of a reversing roller 72a and paper discharge rollers 72b, 72c to discharge the paper P, discharged from the fixing apparatus 40, to a face-down paper discharge tray 80. On a conveying path between the paper discharge roller 72b and the paper discharge roller 72c, a sensor 69 is provided for detecting passing of the paper P.

The both-side module 7 is used for executing a both-side mode for forming images on both sides of the paper P. The both-side module 7 controls drive of the reversing roller 72a and plural paper re-feed rollers 74a to 74d, and re-feeds the paper P, after image formation on one side, again to the registration rollers 25. In more details, the paper P, bearing an image fixed by the fixing apparatus 40 on one side, is supplied to a both-side path by the reversing roller 72a, and then supplied by re-feeding rollers 74a to 74d and the conveying rollers 26 to the registration rollers 25 through the both-side path. The paper P, is once stopped by the registration rollers 25 at the position thereof, and advanced to the secondary transfer region at a predetermined timing. Thereafter, a toner image is similarly transferred onto the other side of the paper P. The both-side path is provided with plural sensors 70, 71 for detecting the passing of the paper P.

The shared data module 10 serves to store information shared by the modules 3 to 9, each of which can access to the shared data module 10 through a communication line 12. Also the controller module 2 can access to the shared data module 10 through the communication lines 112. Information to be stored in the shared data module 10 will be explained later in more details. The controller module 2 issues a print start signal, which is sent to the modules 3 to 9 through the communication lines 112.

In the following, structures of the modules 3 to 9 will be explained with reference to FIG. 3, which is a block diagram showing the constitutions of the modules 3, 6 and 9 in FIG. 1. Now there will be explained examples of the constitutions of the modules 3, 6 and 9.

Figure 3:
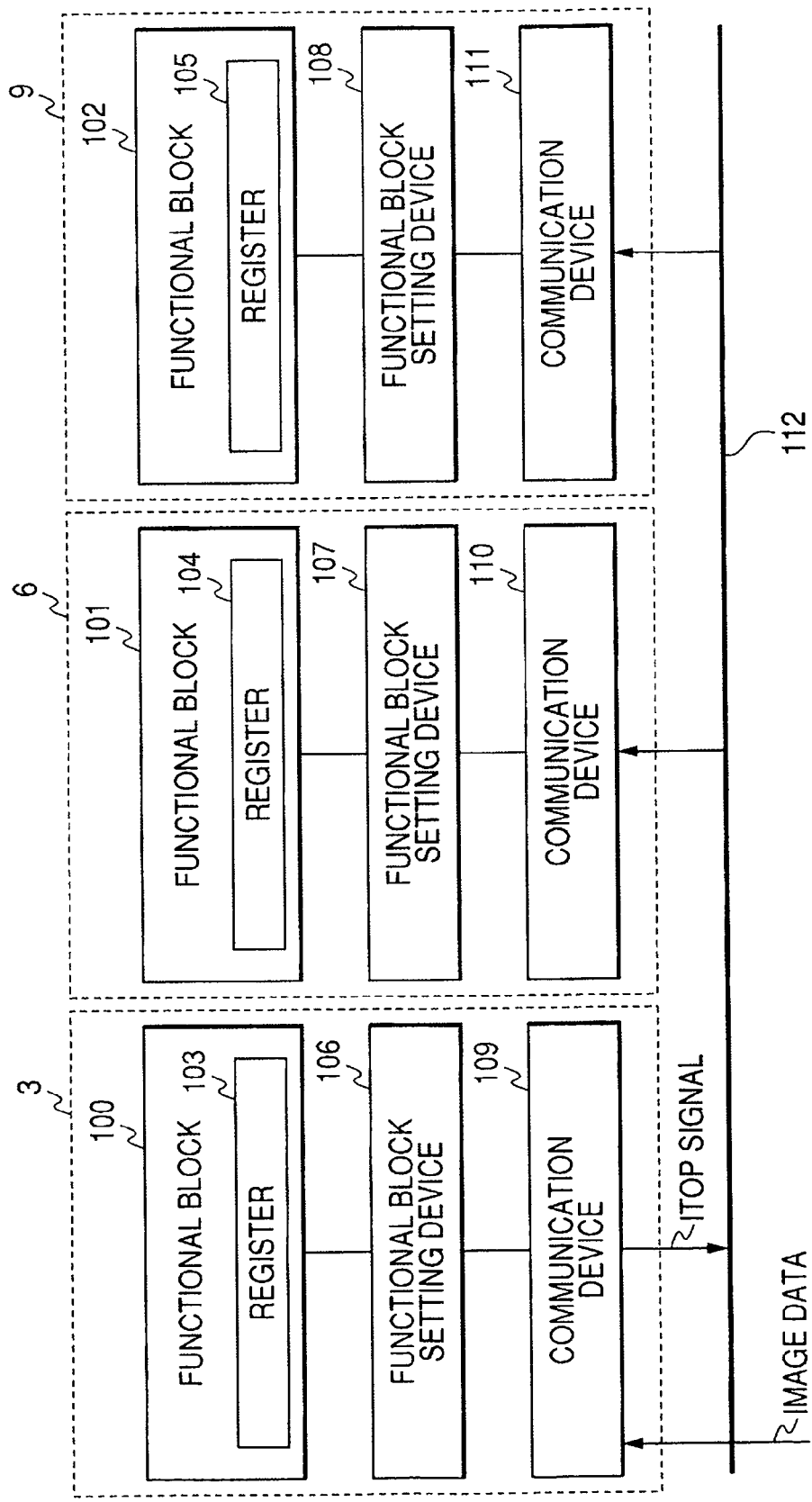
FIG. 3 is a block diagram showing a configuration of modules 3, 6, 9 shown in FIG. 1.

The laser module 3 is provided, as shown in FIG. 3, with a function block 100, a function block setting device 106, and a communication device 109. The function block 100 incorporates a register 103 constituted of plural registers, which hold plural control information required for executing sequences for controlling the scanners 13a to 13d, and operation condition information indicating an operating condition. The function block 100 executes sequences for controlling the scanners 13a to 13d according to the control information in the registers of the register 103. In response, the scanners 13a to 13d execute an operation of emitting laser lights modulated according to the image data entered from the controller module 2, thus irradiating the photosensitive drums 13a to 13d. Also the function block 100 monitors the operating conditions of the scanners 13a to 13d, and writes operation condition information, indicating the operation conditions thereof, into the register 103. Such operation condition includes a start of operation, an end of operation, an abnormal state in operation, and an operation failure.

The function block setting device 106 constitutes an interface between the function block 100 and the communication device 109, and executes renewal of control information in and readout of operation condition information from the registers of the register 103. The function block 100 incorporates plural registers for storing various control information corresponding to operation parameters stored in the shared data module 10, and the function block setting device 106 renews the control information of the registers in the register 103, by referring to the operation parameters mentioned above and the operation condition information of other modules 4 to 9.

The communication device 109 executes a communication with the controller module 2 and the shared data module 10, through the communication line 112. The communication device 109 transmits the operation condition information of the scanners 13a to 13d, read out by the function block setting device 106, to the shared data module 10 through the communication line 112. Also the communication device 109 receives, through the communication line 112, information (operation parameters and operation condition information) read out from the shared data module 10 and the print start signal from the controller module 2. Further, the communication device 109 transmits, through the communication line 112, generation of an abnormality in the operation to the controller module 2. Also the communication device 109 sends an ITOP signal (paper front end signal), to be used as a reference for the operation of the conveyance module 6, to the conveyance module 6 through the communication line 112. Furthermore, the communication device 109 receives image data transmitted from the controller module 2.

The conveyance module 6 is provided, as in the laser module 3, with a function block 101 incorporating a register 104, a function block setting device 107, and a communication device 110. The function block 101 executes sequences for controlling drive of the conveying roller (pre-registration roller) 26 and the registration roller 25 according to control values in the register 104. Thus, the paper P fed from the paper-feed cassette 21a is conveyed, through the conveying rollers 26 and the registration rollers 25, at a predetermined timing to the secondary transfer region between the intermediate transfer belt 30 and the secondary transfer roller 36. Also the function block 101 monitors the conveying condition (operation condition) of the paper P by the conveying rollers (pre-registration rollers) 26 and the registration rollers 25 based on the output of the sensor 67, and writes operation condition information, indicating such conveying condition (operation condition) in the register 104.

The function block setting device 107 constitutes an interface between the function block 101 and the communication device 110, and executes renewal of control information in and readout of operation condition information from the registers of the register 104. The function block setting device 107 incorporates plural registers for storing various control information to be renewed.

The communication device 110 executes a communication with the controller module 2 and the shared data module 10, through the communication line 112. The communication device 110 executes, through the communication line 112, transmission of the operation condition information to the shared data module 10 and reception of information read out from the shared data module 10. Further, the communication device 110 transmits, through the communication line 112, generation of an abnormality in the operation to the controller module 2. Also the communication device 110 receives an ITOP signal (paper front end signal) from the laser module 3 through the communication line 112.

The paper discharge module 9 is provided, as in the laser module 3, with a function block 102 incorporating a register 105, a function block setting device 108, and a communication device 111. The function block 102 executes sequences for controlling drive of the reversing roller 72a and the paper discharge rollers 72b, 72c according to the control information in the register 105. Thus the paper P, discharged from the fixing apparatus 40 after the fixing, is discharged to a face-down paper discharge tray 80. Also the function block 102 monitors the conveying condition (operation condition) of the paper P by the conveying rollers 72a to 72c based on the output of the sensor 69, and writes operation condition information, indicating such conveying condition (operation condition) in the register 105.

The function block setting device 108 constitutes an interface between the function block 102 and the communication device 111, and executes renewal of control information in and readout of operation condition information from the registers of the register 105. The function block setting device 108 incorporates plural registers for storing control information to be renewed.

The communication device 111 executes a communication with the controller module 2 and the shared data module 10, through the communication line 112. The communication device 111 executes, through the communication line 112, transmission of the operation condition information to the shared data module 10 and reception of information read out from the shared data module 10. Further, the communication device 111 transmits, through the communication line 112, generation of an abnormality in the operation to the controller module 2.

The constitution has been explained about the modules 3, 6 and 9, but other modules 4, 5, 7 and 8 are constructed in a similar manner and explanation on these modules will be omitted.

Figure 4:
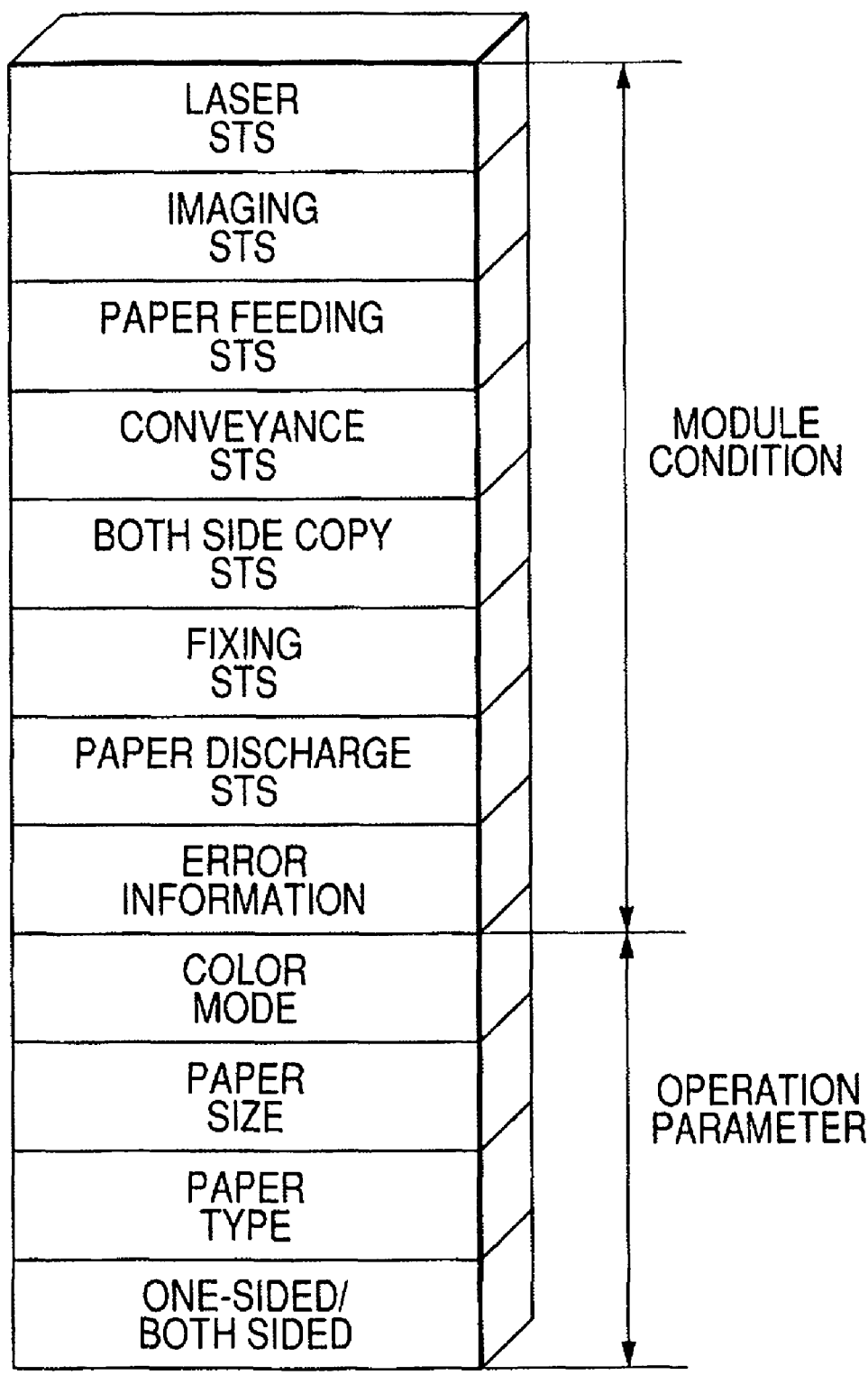
FIG. 4 is a view showing an example of information structure stored in a shared data module 10 in FIG. 1.
Figure 5:
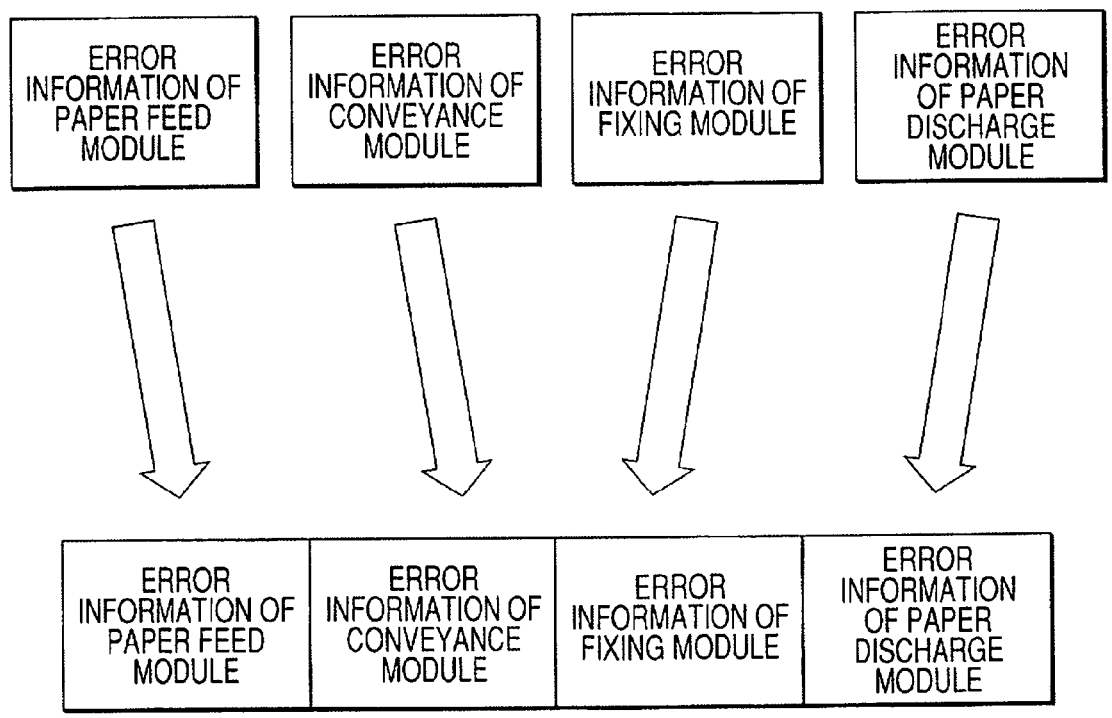
FIG. 5 is a view showing a structure of error information stored in the shared data module 10 in FIG. 1.

In the following, the shared data module 10 will be explained with reference to FIGS. 4 and 5. FIG. 4 is a view showing an example of information structure stored in the shared data module 10 shown in FIG. 1 and FIG. 5 is a view showing a structure of error information stored in the shared data module 10 in FIG. 1.

As shown in FIG. 4, the shared data module 10 has an area for storing operation condition information of the modules 3 to 9, and an area for storing operation parameters to be referred to by the entire apparatus. The area for storing the operation condition of the modules 3 to 9 stores a laser STS indicating the operation condition of the laser module 3, an imaging STS indicating the operation condition of the imaging process module 4, a paper-feed STS indicating the operation condition of the paper-feed cassette module 5, a conveyance STS indicating the operation condition of the conveyance module 6, a both-side STS indicating the operation condition of the both-side module 7, a fixing STS indicating the operation condition of the fixing module 8, a paper-discharge STS indicating the operation condition of the paper-discharge module 9, and error information of the modules 3 to 9.

Error information of each module is information generated in case, in an initializing operation executed by each module when the power supply is turned on, an operation failure state (state in which each module is incapable of shifting to an operation enabled state) is detected. As the error information are mapped in a same address as shown in FIG. 5 and can be read out at a time, the controller module 2 can know the state of initialization on all the modules 3 to 9 at a time. For example, any of the modules 3 to 9 is in an operation failure state, the operating part displays information indicating that the image forming operation is disabled, and information specifying the module in such operation failure state.

The area for storing the operation parameters to be referred to by the entire apparatus stores operation parameters indicating a color mode, a paper size, a paper type, and one/both-side mode.

Figure 6:
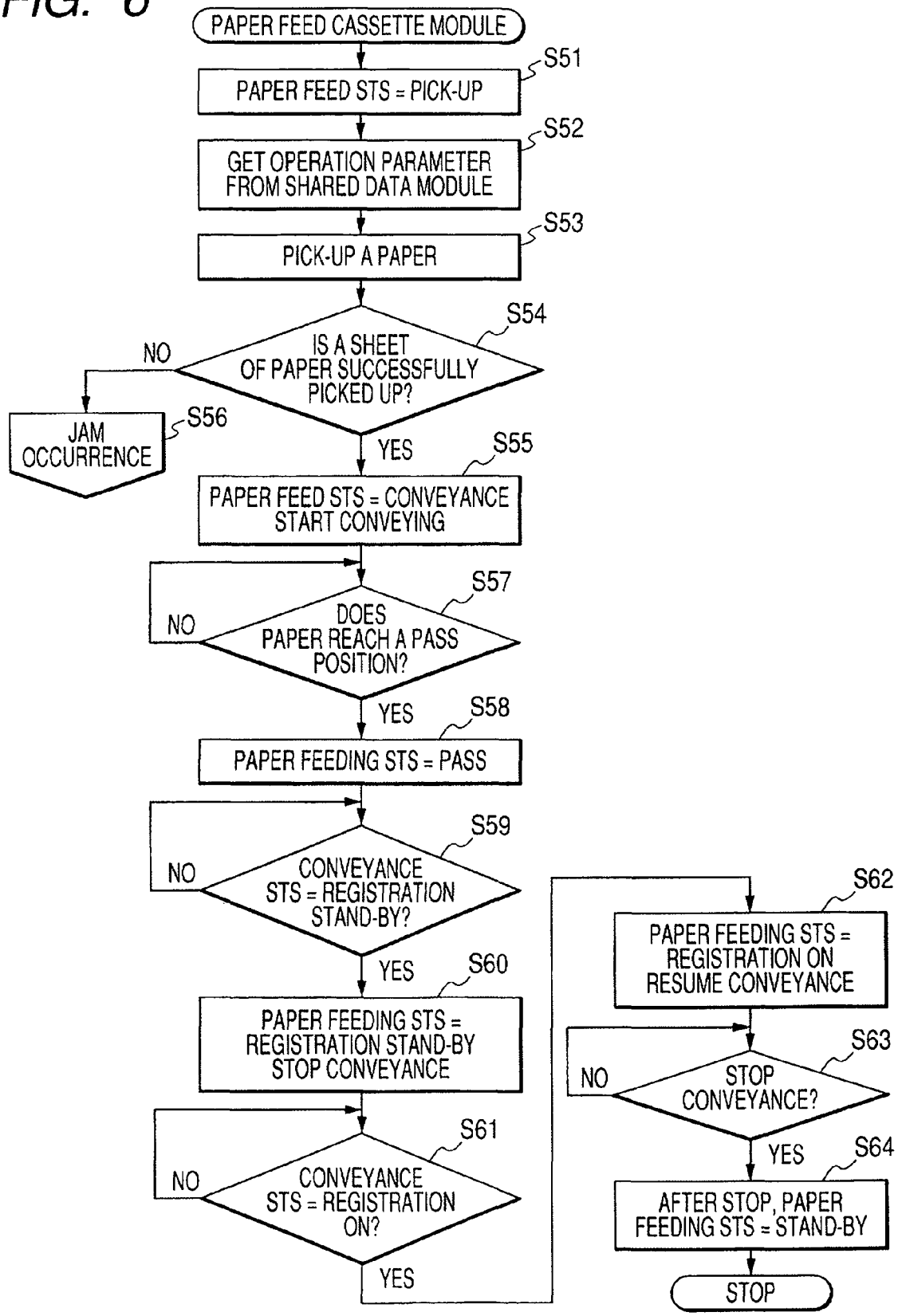
FIG. 6 is a flow chart showing an operation sequence of a paper-feeding cassette module 5 shown in FIG. 1.
Figure 7:
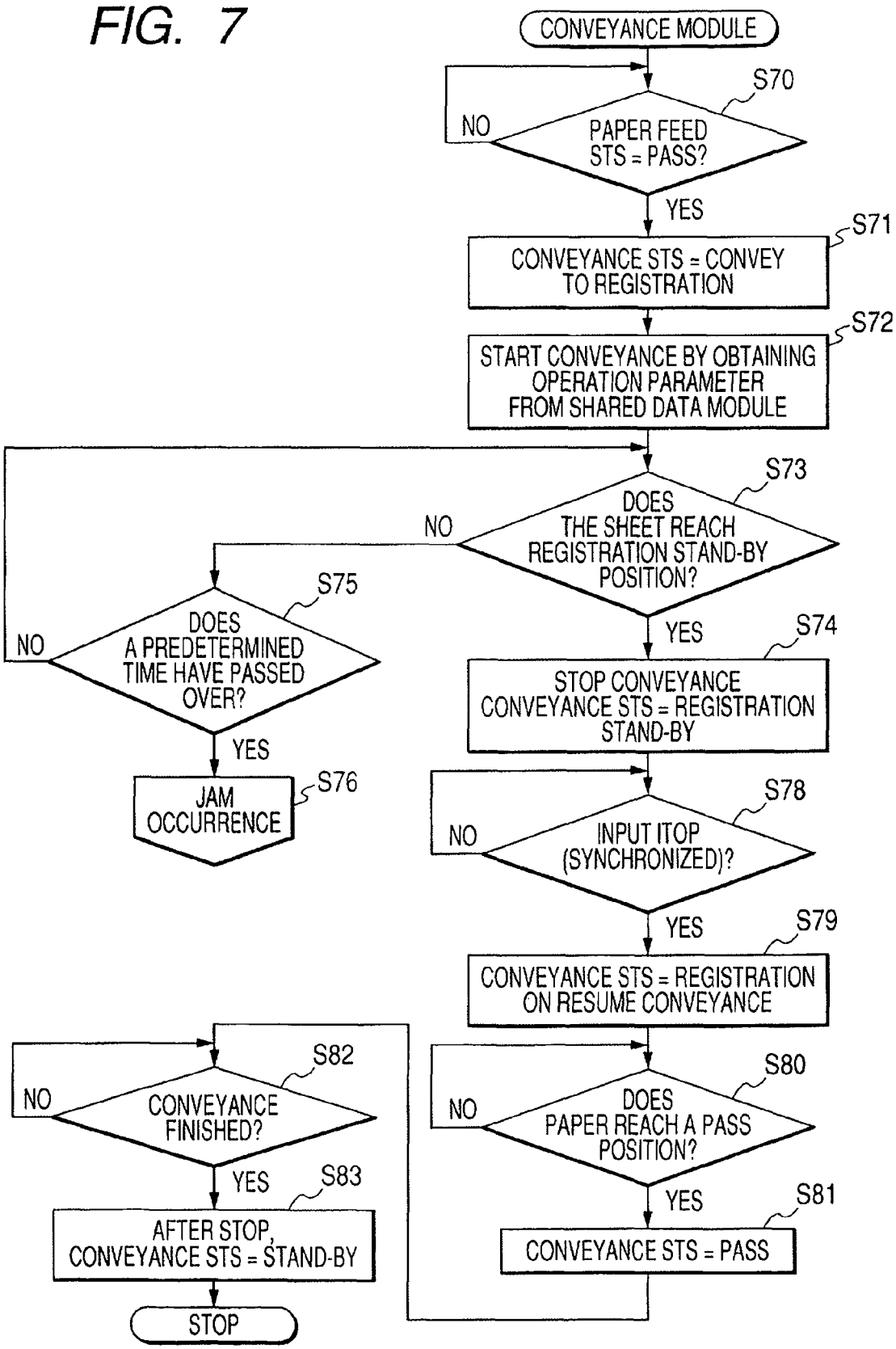
FIG. 7 is a flow chart showing an operation sequence of a conveyance module 6 shown in FIG. 1.
Figure 8:
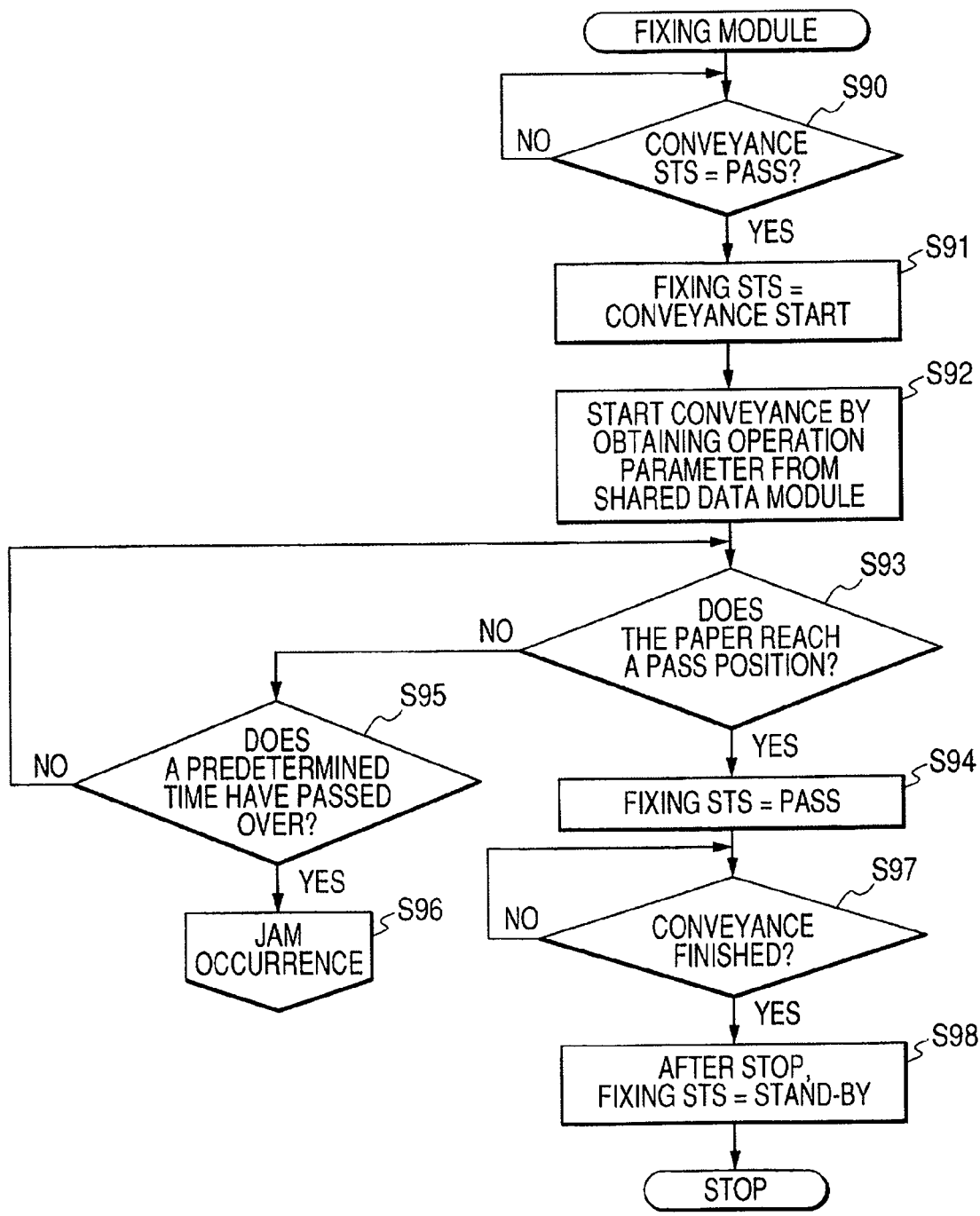
FIG. 8 is a flow chart showing an operation sequence of a fixing module 8 shown in FIG. 1.
Figure 9:
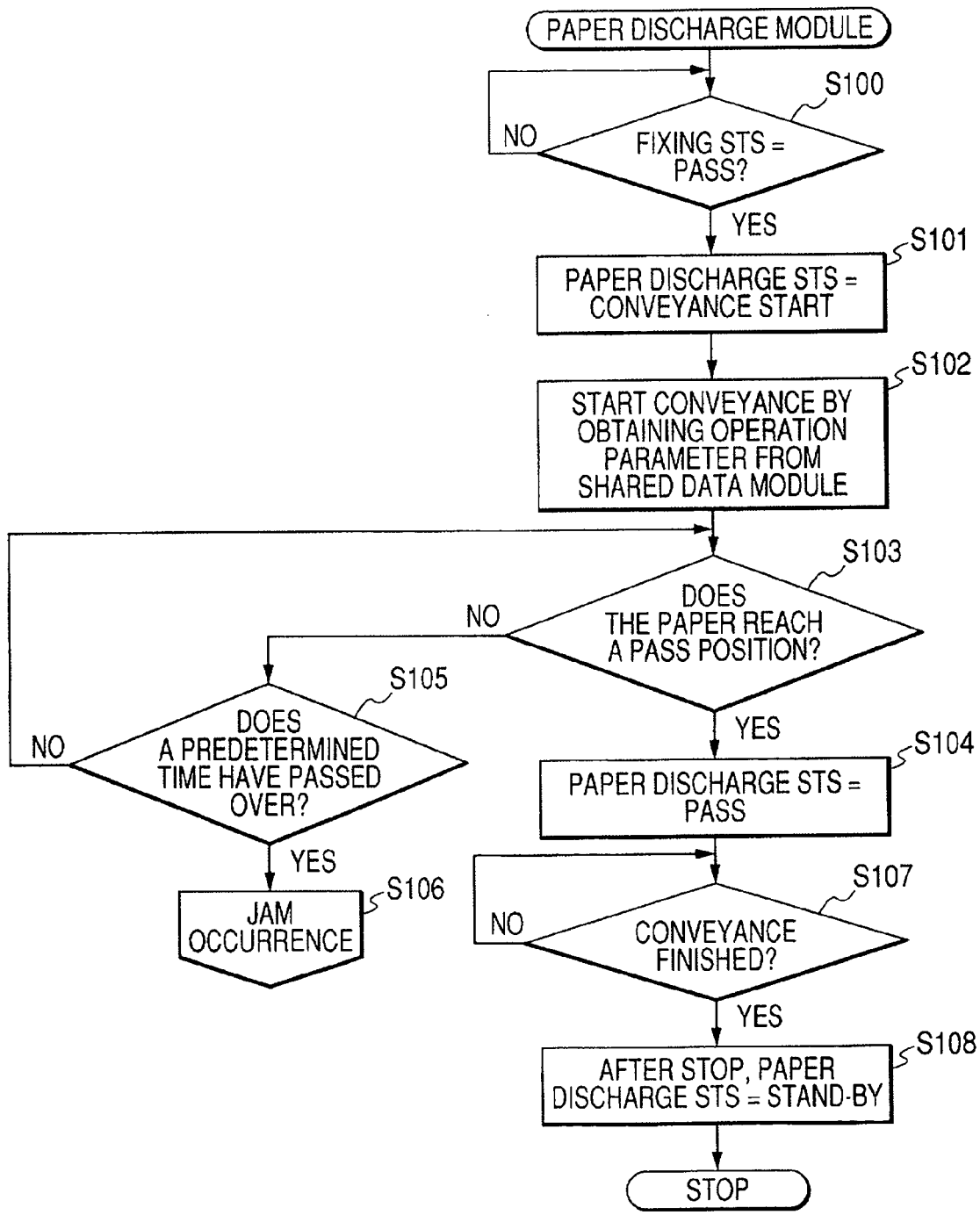
FIG. 9 is a flow chart showing an operation sequence of a paper-discharge module 9 shown in FIG. 1.

In the following, the conveying operations for the paper P in the present image forming apparatus will be explained with reference to FIGS. 6-9. FIG. 6 is a flow chart showing the operation sequence of the paper-feeding cassette module 5 shown in FIG. 1; FIG. 7 is a flow chart showing the operation sequence of the conveyance module 6 shown in FIG. 1; FIG. 8 is a flow chart showing the operation sequence of the fixing module 8 shown in FIG. 1; and FIG. 9 is a flow chart showing the operation sequence of the paper-discharge module 9 shown in FIG. 1.

As an example, in case of forming a full-color image on an A4-sized paper P, operation parameters are inputted from the operating part (not shown) or from a personal computer, and are written, by the controller module 2, into the shared data module 10. In the present example, there are written "color mode"="full-color", "paper size"="A4", "paper type"="plain paper", and "one/both side"="one side". In the foregoing explanation, it is assumed that such information is written through the controller module 2, but, in case of an apparatus executing a copy mode only, the operation parameters may be written from the operating part directly into the shared data module 10.

Then, when a start of an image formation is instructed from the operating part or the personal computer, a print start signal is supplied from the controller module 2 through the communication line 112 to the respective modules 3 to 9, which thus initiate specific operation.

As regards the conveying of the paper P, at first, as shown in FIG. 6, the paper-feed cassette module 5 writes that a pickup operation is in progress, as the paper-feed STS (step S51). In the following, such state will be represented as "paper-feed STS=[in pickup]". Then the paper-feed cassette module 5 acquires operation parameters from the shared data module 10 (step S52), and starts a pickup operation for the sheet P according to the operation parameters (step S53. This pickup operation advances the paper P one by one from the cassette 21a by the pickup roller 22a and the paper-feed rollers 23a, to the extraction rollers 24a.

Then the paper-feed cassette module 5 discriminates whether the pickup operation has been successful, based on whether the sensor 64a has detected the paper P advanced by the pickup operation (step S54). In case the paper P is detected by the sensor 64a, the pickup operation is judged successful, and the paper-feed cassette module 5 writes paper-feed STS="in conveying", and continues the conveying operation (step S55). Through the conveying operation, the paper P is conveyed through the conveying rollers (pre-registration rollers) 26 to the registration rollers 25. Then the paper-feed cassette module 5 awaits, based on the output of the sensor 67, that the paper P reaches a transfer position (step S57). The transfer position means a position where the leading end of the paper impinges on the nip portion of the registration rollers 25. When the paper P reaches the transfer position, the paper-feed cassette module 5 writes "paper-feed STS=[transfer]" (step S58), and awaits that the conveyance module 6 reaches a state of "conveyance STS=[awaiting registration]" (step S59). The state "conveyance STS=[awaiting registration]" is attained when the leading end of the paper P impinges on the registration rollers 25. When the state "conveyance STS=[awaiting registration]" is attained, the paper-feed cassette module 5 writes "paper-feed STS=[awaiting registration]", and once interrupts the conveying of the paper P (step S60).

Then the paper-feed cassette module 5 awaits that the conveyance STS of the conveyance module 6 becomes [registration on] (step S61), and, when the conveyance STS becomes [registration on], writes "paper-feed STS=[registration on]" and re-starts the conveying operation (step S62). Then the paper-feed cassette module 5 awaits the completion of conveyance of the paper P (step S63), and, upon completion of conveyance of the paper P, writes "paper feed STS=[stand-by state]" (step S64). Thus the paper-feed cassette module 5 terminates the process.

In case the aforementioned step S54 judges that the pickup operation is unsuccessful, the paper-feed cassette module 5 judges that a jam occurs and executes a corresponding process (step S56).

The operation sequence explained above is executed in case the length of the paper P and the length of the conveying path satisfy a predetermined relationship, and a different operation sequence may be adopted depending on the relationship of the length of the paper P and the length of the conveying path.

The conveyance module 6 awaits, as shown in FIG. 7, a state "paper-feed=[transfer]" (step S70). When the state "paper-feed=[transfer]" is reached, the conveyance module 6 writes "conveyance STS=[conveyance to registration]" (step S71). Then the conveyance module 6 acquires operation parameters from the shared data module 10 and starts a conveying operation according to the operation parameters (step S72).

Then the conveyance module 6 discriminates whether the paper P has reached a paper registration stand-by position (step S73). If not, the conveyance module 6 discriminates whether a predetermined time has elapsed from the start of the conveying operation (step S75). In case the predetermined time has not elapsed from the start of the conveying operation, it discriminates again whether the paper P has reached a paper registration stand-by position (step S73). When the paper P reaches the registration stand-by position before the lapse of the predetermined time from the start of the conveying operation, the conveyance module 6 once interrupts the conveyance of the paper P, and writes "conveyance STS=[registration stand-by]" (step S74).

Then the conveyance module 6 awaits an entry of the ITOP signal from the laser module 3 (step S78). When the ITOP signal is entered, the conveyance module 6 measures a timing of advancing the paper P from the registration stand-by position, based on such ITOP signal (timing of starting image formation), and starts rotation of the registration rollers 25 at such timing (step S79). At the same time, the conveyance module 6 writes "conveyance STS=[registration on]". The timing of advancement of the paper P by the conveyance module 6 is so selected that the paper P and the full-color toner image, primary transferred onto the intermediate transfer belt 30 mutually match in the secondary transfer region.

In the laser module 3 and the imaging process module 4, upon receiving the print start signal, a toner image formed by the aforementioned process on the photosensitive drum 11d, at the most upstream position in the rotating direction of the intermediate transfer belt 30, is transferred thereon in the primary transfer region by means of the transfer roller 35d under the application of a high voltage. The primary transferred toner image is conveyed to the next primary transfer region, in which the image formation is executed with a delay corresponding to a time required for conveying the toner image through the photosensitive drums 11a-11d, whereby a next toner image is transferred onto the preceding image with matching leading ends of the images. Finally, toner images of four colors are transferred in superposition on the intermediate transfer belt 30, whereby a full-color toner image is formed thereon. Subsequently, the paper P enters the secondary transfer region and comes into contact with the intermediate transfer belt 30. A high voltage is applied to the secondary transfer roller 36 so as to match the timing of passing of the paper P, whereby the full-color toner image formed on the intermediate transfer belt 30 is transferred onto the paper P.

Then the conveyance module 6 awaits, based on the output of the sensor 67, that the paper P reaches a transfer position to the fixing module 8 (step S80), and, when the paper P reaches the transfer position, writes "conveyance STS=[transfer]" (step S81). Then the conveyance module 6 awaits the completion of conveyance of the paper P (step S82), and, upon completion of the conveyance, stops the operation and writes "conveyance STS=[stand-by state]" (step S83), thereby terminating the process.

In case the aforementioned step S75 identifies that the predetermined time has elapsed before the paper P reaches the registration stand-by position, the conveyance module 6 judges that a jam has occured and executes a corresponding process (step S76). Details of such process will be explained later.

The fixing module 8 awaits, as shown in FIG. 8, a state "conveyance STS=[transfer]" (step S90). When the state "conveyance STS=[transfer]" is reached, the fixing module 8 writes "fixing STS=[start conveyance]" (step S91). Then the fixing module 8 acquires operation parameters from the shared data module 10 and starts a conveying operation according to such operation parameters (step S92).

Then the fixing module 8 discriminates, based on the output of the sensor 68, whether the paper P has reached a transfer position to the paper discharge module 9 (step S93). If not, the fixing module 8 discriminates whether a predetermined time has elapsed from the start of the conveying operation (step S95), and, if not, it discriminates again whether the paper P has reached transfer position (step S93). When the paper P reaches the transfer position before the lapse of the predetermined time from the start of the conveying operation, the fixing module 8 writes "fixing STS=[transfer]" (step S94). Then the fixing module 8 awaits the completion of conveyance of the paper P (step S97), and, upon completion of the conveyance, stops the operation and writes "fixing STS=[stand-by state]" (step S98), thereby terminating the process.

In case the aforementioned step S95 identifies that the predetermined time has elapsed before the paper P reaches the transfer position, the fixing module 8 judges that a jam has occurred and executes a corresponding process (step S96).

The paper discharge module 9 awaits, as shown in FIG. 9, a state "fixing STS=[transfer]" (step S100). When the state "fixing STS=[transfer]" is reached, the paper discharge module 9 writes "paper discharge STS=[start conveyance]" (step S101). Then the paper discharge module 9 acquires operation parameters from the shared data module 10 and starts a conveying operation according to such operation parameters (step S102).

Then the paper discharge module 9 discriminates, based on the output of the sensor 69, whether the paper P has reached a transfer position to the face-down paper discharge tray 80 (step S103). If not, the paper discharge module 9 discriminates whether a predetermined time has elapsed from the start of the conveying operation (step S105), and, if not, it discriminates again whether the paper P has reached transfer position (step S103). When the paper P reaches the transfer position before the lapse of the predetermined time from the start of the conveying operation, the paper discharge module 9 writes "paper discharge STS=[transfer]" (step S104).

Then the paper discharge module 9 awaits the completion of conveyance of the paper P (step S107), and, upon completion of the conveyance, stops the operation and writes "paper discharge STS=[stand-by state]" (step S108), thereby terminating the process.

In case the aforementioned step S105 identifies that the predetermined time has elapsed before the paper P reaches the transfer position, the paper discharge module 9 judges that a jam has occurred and executes a corresponding process (step S106).

Figure 10:
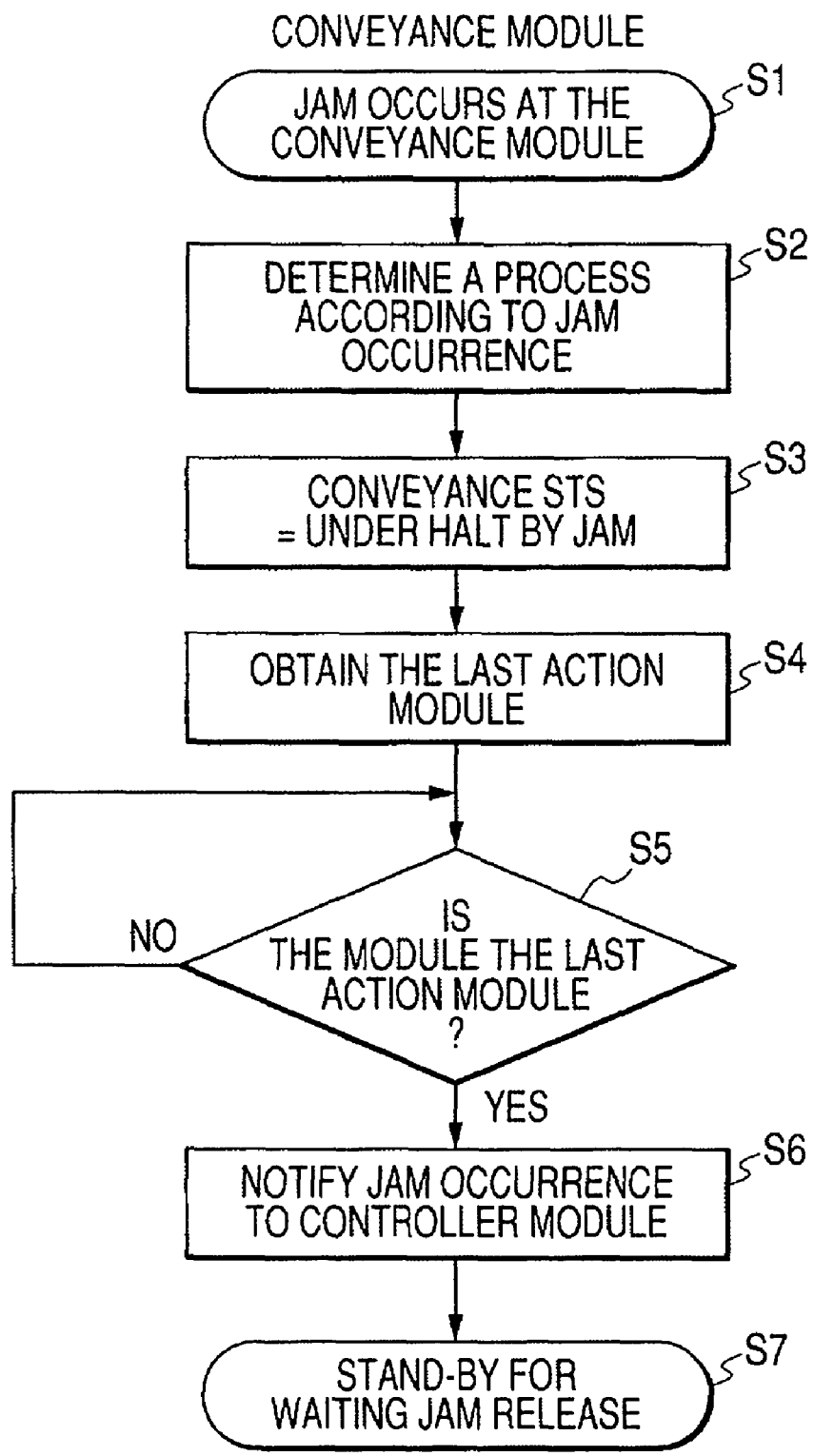
FIG. 10 is a flow chart showing an operation sequence of the conveyance module 6 in case of a sheet jam therein.

In the following, operations in case a jam occurred in the conveyance module 6 will be explained with reference to FIGS. 10 and 11. FIG. 10 is a flow chart showing an operation sequence of the conveyance module 6 in case of a jam therein while FIG. 11 shows a table to be used for determining a process to be executed, in the step S2 shown in FIG. 10.

As shown in FIG. 10, in case a jam occurs in the conveyance module 6 (step S1), it refers to a table shown in FIG. 11 and determines a process to be executed according to the type of the occurred jam (step S2). Then the conveyance module 6 writes "conveyance STS=[under halt by jam]" (step S3). Then the conveyance module 6 refers to the table shown in FIG. 11 and determines a last action module (step S4). In case of a jam generation in the conveyance module 6, other modules execute actions corresponding to such jam generation, and, among such other modules, a module executing the action lastly is the last action module.

Then the conveyance module 6 awaits thus determined last action module terminates the action (step S5), and, when the last action module terminates the action, judges that all the actions in other modules have been completed and informs the controller 2 of the jam generation (step S6). Upon receiving the information of jam generation from the conveyance module 6, the controller 2 displays a corresponding message on the operating part (not shown). In case of a print output for example from a personal computer, the controller 2 informs the personal computer of the jam generation. Then the conveyance module 6 waits in a state waiting for a jam release (step S7).

In the above-explained procedure, the conveyance module 6, upon detecting completion of the action of the specified last action module, judges that all the actions in other modules have been terminated and informs the controller 2 of the jam generation. Instead, it is also possible to await the completion of all the actions in other modules, and, upon detecting that all the actions in other modules have been completed, to inform the controller 2 of the jam generation.

When the conveyance module 6 enters a state "conveyance STS=[under halt by jam]", other modules detects the operation condition of the conveyance module 6, namely "in halt by jam" as indicated by the conveyance STS, and execute corresponding actions.

More specifically, in case of a jam generation in the conveyance module 6, a paper P present in the modules of the downstream side still has to be processed and discharged to the face-down discharge tray 80. Therefore, the fixing module 8 and the paper discharge module 9 at the downstream side continue, in cooperation, operations to the paper discharge to the face-down discharge tray 80. On the other hand, the laser module 3, the imaging process module 4 and the paper-feed cassette module 5 enter a state waiting for a jam release. For example the laser module 3 no longer accepts the image data input.

In this manner, in case a jam occurs in any of the paper-feed cassette module 5, conveyance module 6, both-side module 7, fixing module 8 and paper discharge module 9 serving to convey the paper P, other modules execute actions for responding to such jam generation. Such action for responding to such jam generation is to be determined for each module, according to the module in which the jam occurs and the content of such jam, and, for such determination, a table which represent a module in which a jam occurs, a kind of jam and a processing for jam by associating with them is used.

Figure 12:
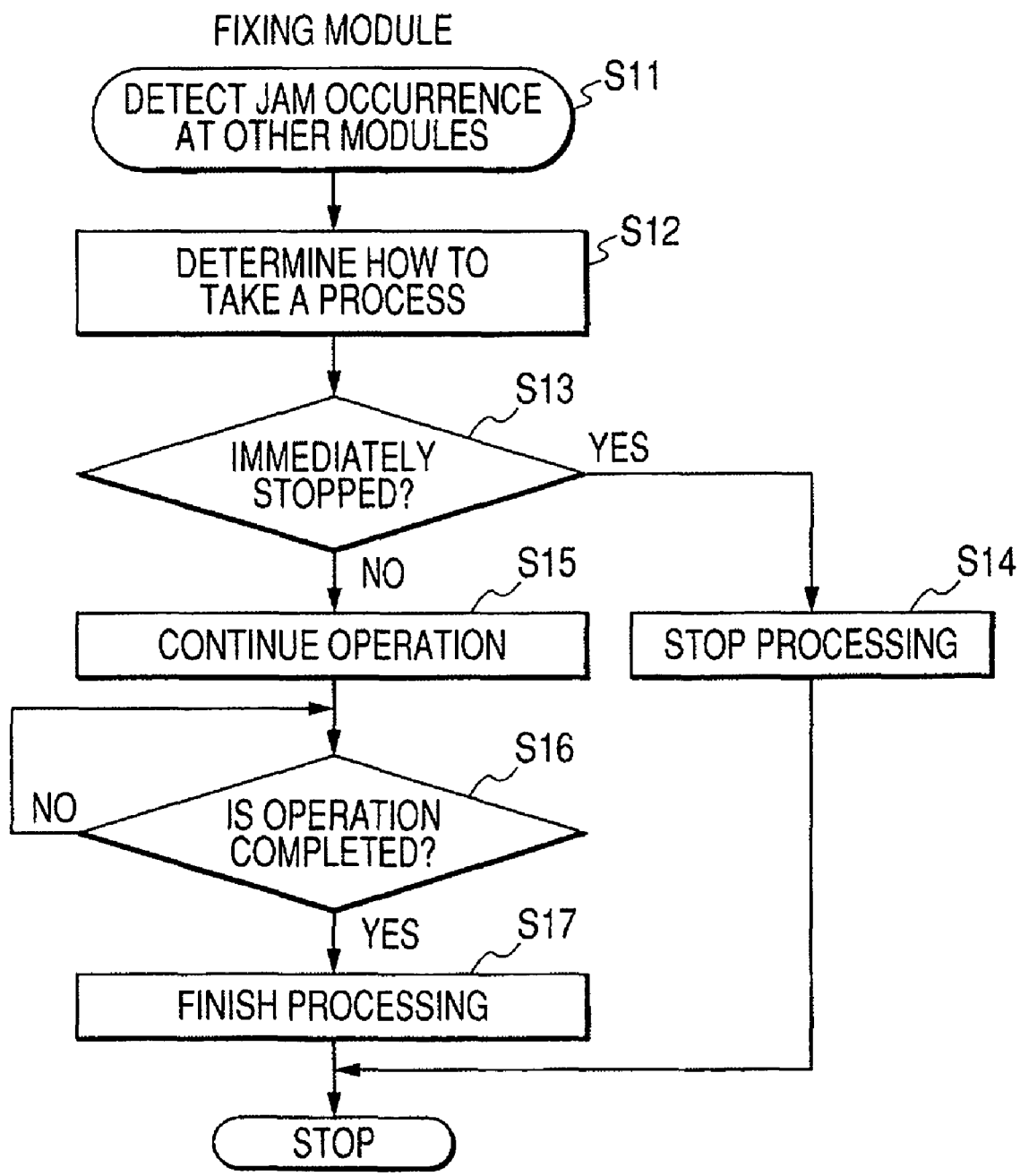
FIG. 12 is a flow chart showing an operation sequence of the fixing module 8 upon detecting a jam in another module.

As an example, actions to be executed by the fixing module 8, in case of detecting a jam in another module, will be explained with reference to FIGS. 12 and 13. FIG. 12 is a flow chart showing an operation sequence of the fixing module 8 upon detecting a jam in another module, and FIG. 13 shows a table to be used for determining a process to be executed, in a step S12 in FIG. 12.

For example, the fixing module 8, upon referring to the STS information of the shared data module 10 and detecting "STS=[halt by jam]" in another module as shown in FIG. 12 (step S11), refers to a table shown in FIG. 13 and determines an action to be taken, based on the jam-generating module and the type of occured jam (step S12). Then the fixing module 8 discriminates whether the determined action is an immediate stop action (step S13). If so, the fixing module 8 executes a stopping action (step S14) and terminates the process. On the other hand, in case the determined action is not an immediate stop but a continuation of operation, the fixing module 8 continues the operations (step S15), and, after the completion of operations (step S16), executes an ending action (step S17), whereby the fixing module 8 terminates the sequence.

As an example, in case the fixing module 8 detects a jam generation in the conveyance module 6 ("conveyance STS= [halt by jam]"), the fixing module 8 determines, based on the table shown in FIG. 13, a stop after operation as the action to be executed (step S12). Then the fixing module 8 completes conveyance of the paper P present in the fixing module 8 (steps S15 to S17), whereupon the fixing module terminates the sequence.

In the foregoing, there have been explained, as representative examples, the operations of the conveyance module 6 in case of a jam generation therein and those of the fixing module 8 in case of a jam generation in another module, and, in case of an abnormality in the operations including a jam which occurred in any of the modules, other modules execute actions similar to those explained above.

In the present embodiment, as explained in the foregoing, each of the modules 3 to 9 executes a specific operation in autonomous manner, by referring to the operation parameters and the operation condition information indicating the operation conditions of the modules 3 to 9, stored in the shared data module 10. In this manner, the controls relating to the image formation are not concentrated but can be realized in a dispersed manner. It is also possible to securely maintain a matching between the operations executed by the modules.

Also, since the operation condition information indicating the operation conditions of the modules 3 to 9 are stored in the shared data module 10, it is possible to simplify the communication in each module for acquiring the operation condition of other modules.

Furthermore, in case an abnormal in operation like a jam occurs in any of the modules 5 to 9, each of the modules 5 to 9 executes an action for responding to such abnormality, depending on the abnormality-generating module and the content of such abnormality in operation. Also in case the module is a last action module, it informs the controller module 2 of generation of abnormality in operation. Therefore, also in case of an abnormality in the operation, each of the modules 5 to 9 can execute an action for responding to such abnormality, in an autonomous manner.

This application claims priority from Japanese Patent Application No. 2005-080496 filed on Mar. 18, 2005, which is hereby incorporated by reference herein.

What is claimed is:

1. An image forming apparatus for forming an image by a plurality of image forming operations corresponding to the image, comprising:

a plurality of modules each of which executes an operation which is assigned to each individual module from among the plurality of image forming operations corresponding to the image; and a shared data storing device for storing shared information to be shared by said plurality of modules;

wherein each of said plurality of modules stores operation condition information, indicating an operation condition, as shared information in the shared data storing device;

wherein each individual module of said plurality of modules executes the operation assigned to the individual module by referring to the information in said shared data storing device to form the image in cooperation with the other modules of the plurality of modules;

wherein the operation assigned to each individual module is different from operations assigned to and executed by the other modules of said plurality of modules;

wherein the operation condition information stored in the shared data storing device includes operation condition information indicating that an abnormality in operation occurs; and wherein when an abnormality in operation occurs in any of said plurality of modules, a module in which the abnormality in operation occurs stores operation condition information, indicating a generation of the abnormality in operation, in the shared data storing device, without interacting with any other of the plurality of modules, and executes an operation corresponding to a type of the abnormality in operation, and each of other modules refers to the operation condition information stored in the shared data storing device, without interacting with any other of the plurality of modules, and executes an operation according to the module in which an abnormality in operation is occurs and a type of the abnormality in operation wherein said shared data storing device stores an operation parameter to be used in common by said plurality of modules as shared information with operation condition information of each of said plurality of modules.

2. An image forming apparatus according to claim 1, wherein each of said plurality of modules includes a device for executing a sequence for realizing the assigned operation, based on the operation parameter and the operation condition information of the corresponding module.

3. An image forming apparatus according to claim 1, wherein the module in which the abnormality in operation occurs, after executing the operation corresponding to the type of the abnormality in operation, waits for a completion of all of the operations in other modules and then executes a process for informing a user that the abnormality in operation occurs.

4. An image forming apparatus according to claim 3, wherein the module in which the abnormality in operation occurs, after executing the operation corresponding to the type of the abnormality in operation, specifies a module to execute the operation lastly, and, upon detecting a completion of the operation in the specified module, judges that all of the operations in other modules are completed and then executes a process for informing a user that the abnormality in operation occurs.

5. An image forming apparatus according to claim 4, wherein the plural modules include a controller module; and the controller modules sends a print start signal to other modules when a start of an image formation is instructed.

6. An image forming apparatus according to claim 5, wherein after a completion of operation of the module which lastly execute an operation, it is informed to the controller module that the abnormality in operation occurs.

7. An image forming apparatus according to claim 6, wherein the abnormality in operation is informed to the user by a display in an operating part.

8. An image forming apparatus according to claim 1, wherein each of said plurality of modules at least includes:
a paper-feed module for feeding a sheet;
a conveyance module for conveying a sheet fed by the paper-feed module;
a fixing module for fixing an image on the sheet conveyed by the conveyance module; and
a paper discharge module for discharging a sheet on which the image is fixed by said fixing module.

9. An image forming apparatus according to claim 1, wherein the shared data storing device stores error information respectively corresponding to said plurality of modules in an initialization operation.

10. An image forming apparatus according to claim 9, wherein the error information is mapped in a same address and is readable at one time.

11. A control method for an image forming apparatus for forming an image by a plurality of image forming operations corresponding to the image, the image forming apparatus including a plurality of modules each of which executes an operation which is assigned to each individual module from among the plurality of image forming operations; and a shared data storing device for storing shared information to be shared by the plurality of modules, the method comprising:
a step of storing operation condition information indicating an operation condition of each of said plurality of modules into the shared data storing device as shared information;
a step of executing a specific operation with each of said plurality of modules by referring to the information in the shared data storing device in each of said plurality of modules to form the image in cooperation with the other modules of the plurality of modules; and
wherein the specific operation is different from other specific operations executed by the other modules of said plurality of modules
wherein the operation condition information includes operation condition information indicating that an abnormality in operation occurs; and
wherein when an abnormality in operation occurs in any of said plurality of modules, a module in which the abnormality in operation occurs stores operation condition information, indicating a generation of the abnormality in operation, in the shared data storing device, without interacting with any other of the plurality of modules, and executes an operation corresponding to a type of the abnormality in operation, and each of other modules refers to the operation condition information stored in the shared data storing device, without interacting with any other of the plurality of modules, and executes an operation according to the module in which an abnormality in operation is occurs and a type of the abnormality in operation wherein said shared data storing device stores an operation parameter to be used in common by said plurality of modules as shared information with operation condition information of each of said plurality of modules.

* * * * *